Sept. 16, 1947.    O. R. NEMETH    2,427,568
MOTION PICTURE FILM ACTUATING MECHANISM
Filed Aug. 17, 1944    6 Sheets-Sheet 1

Inventor
Otto R. Nemeth
By R. J. Schwarz
Attorney.

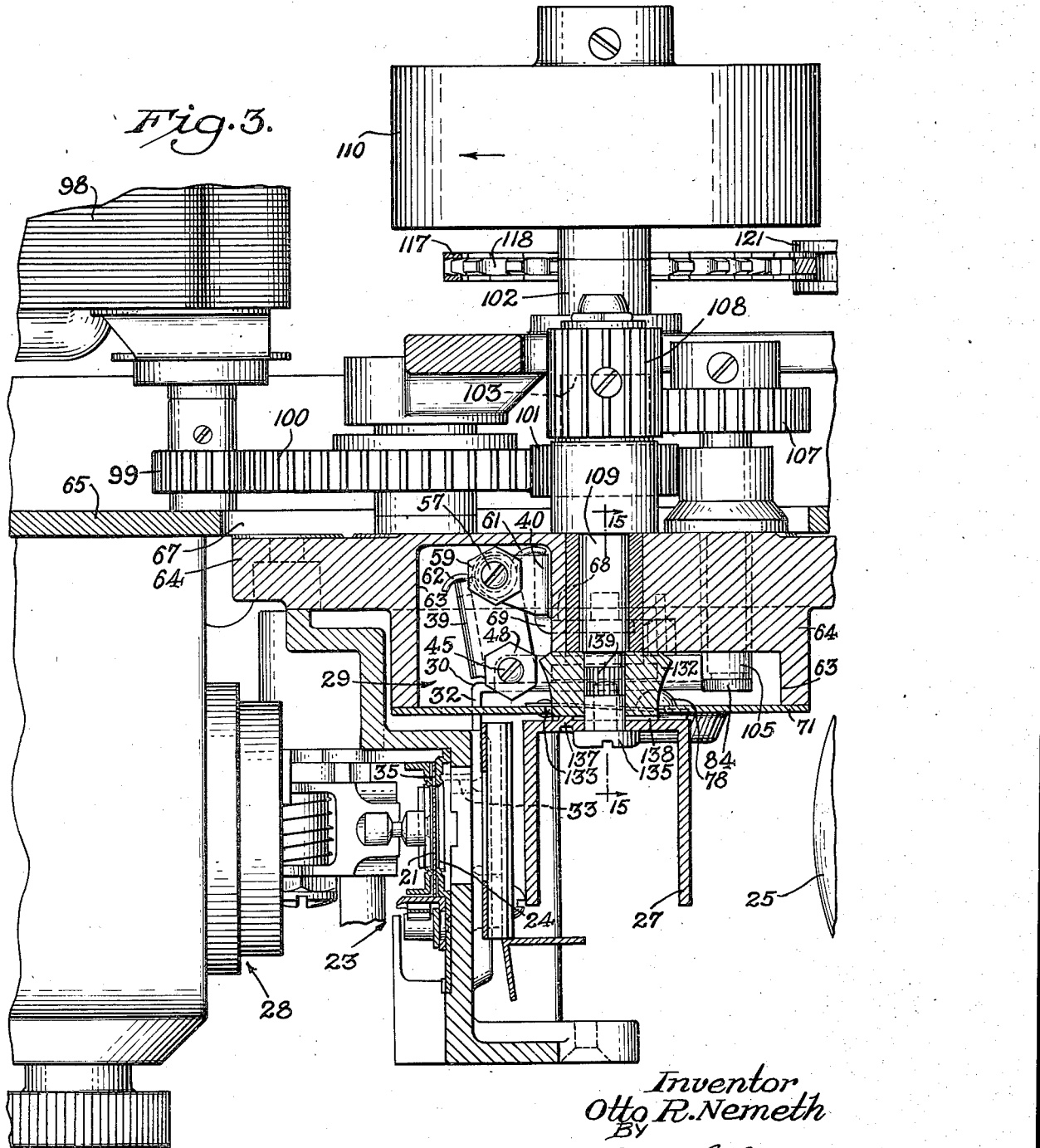

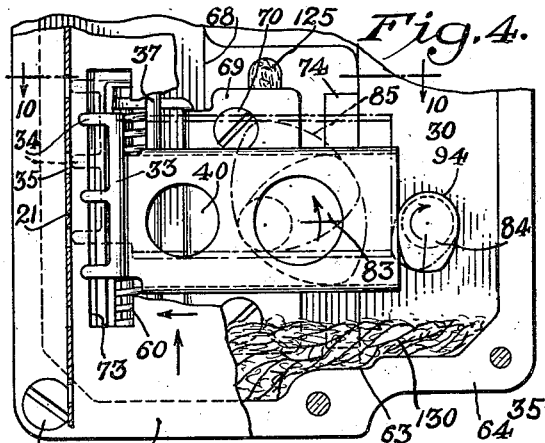
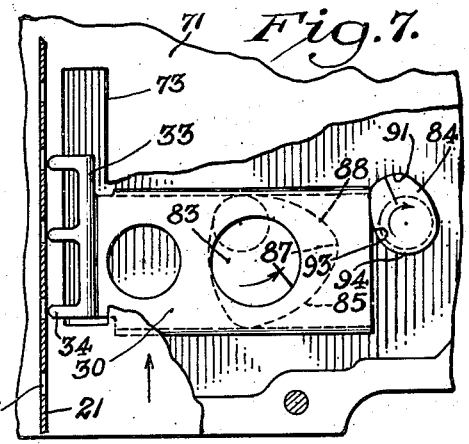
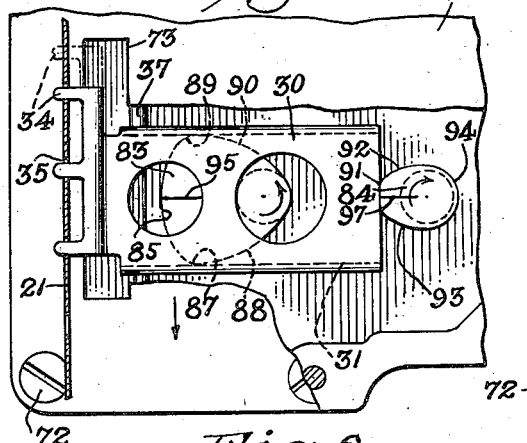
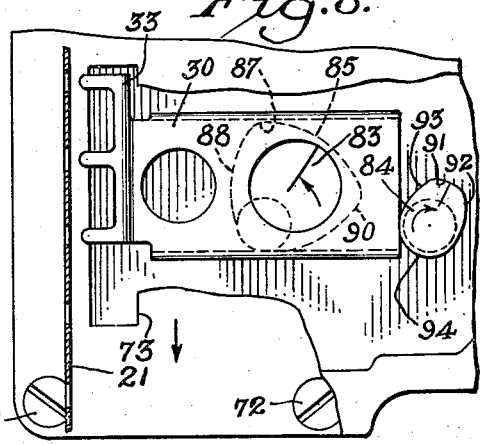
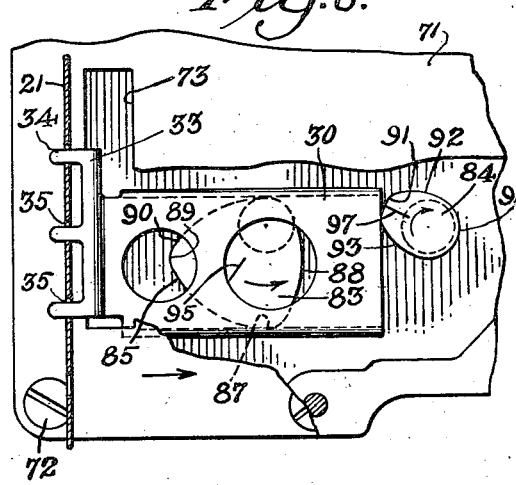

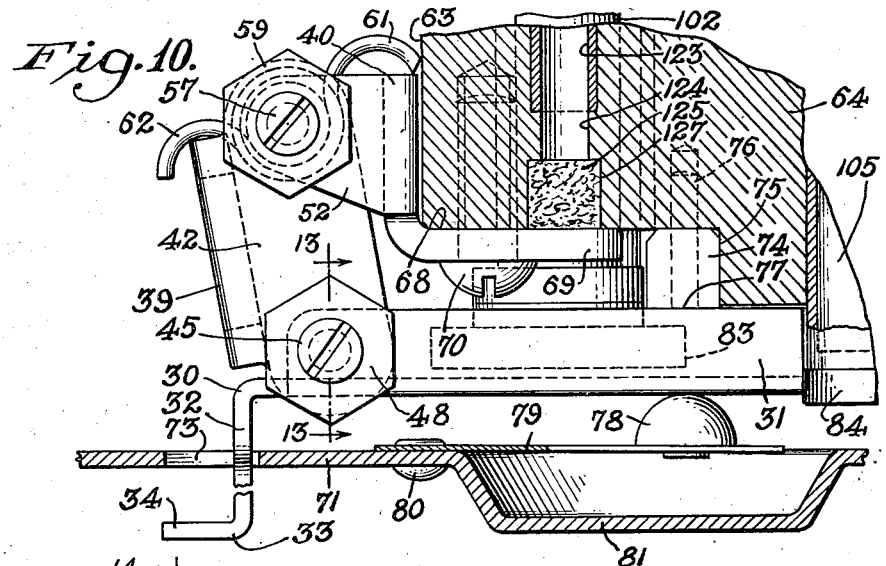
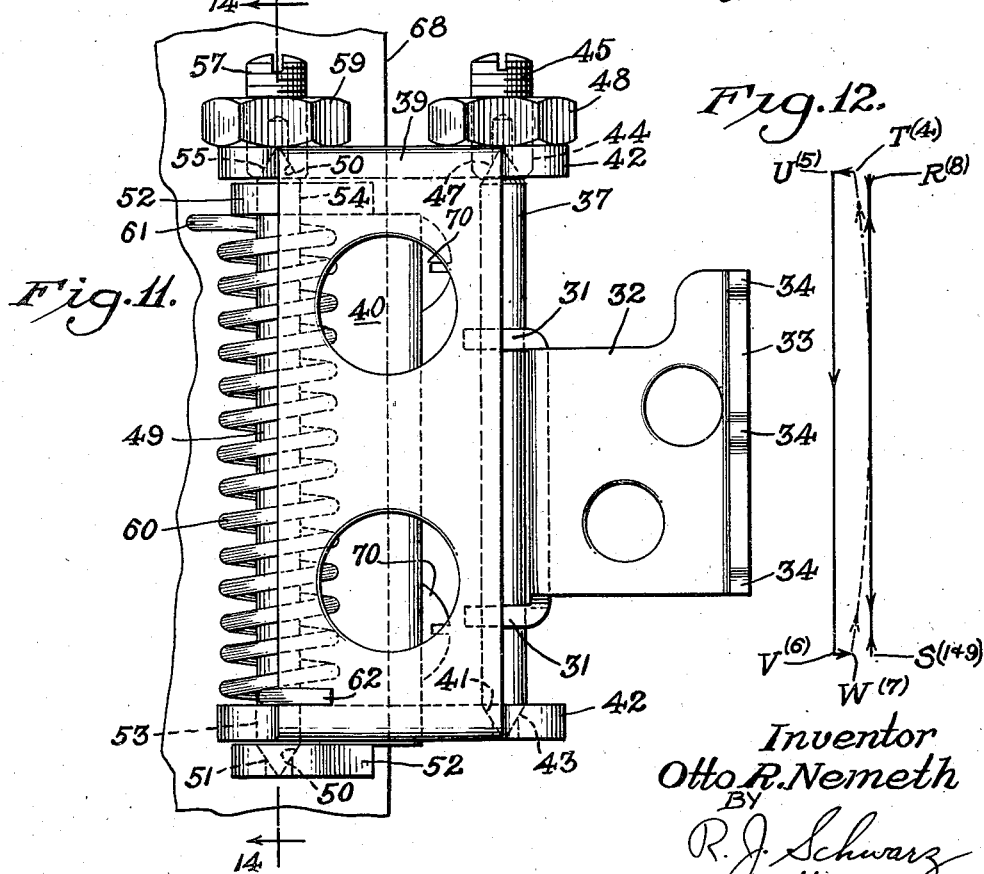

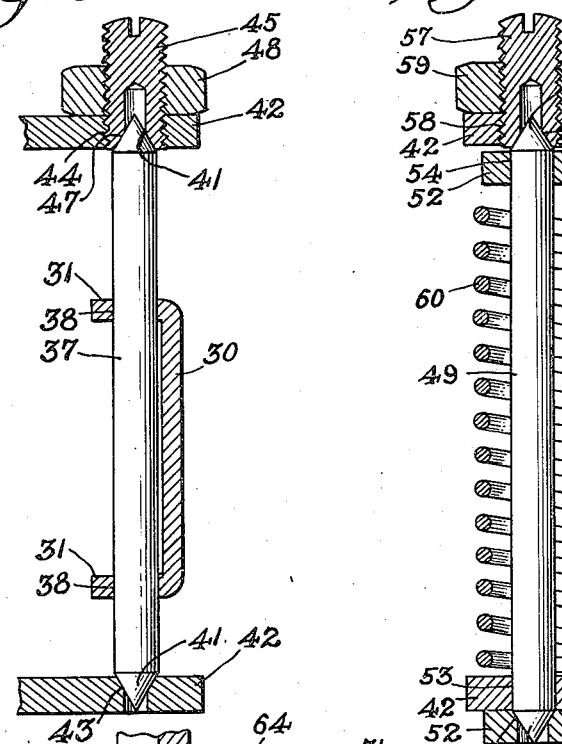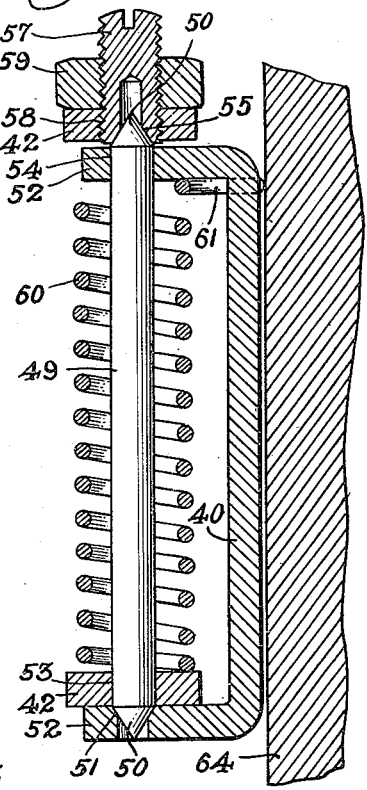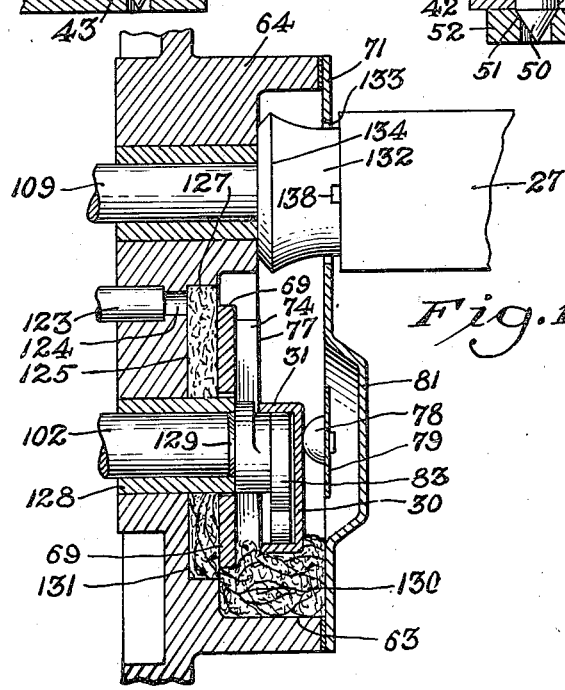

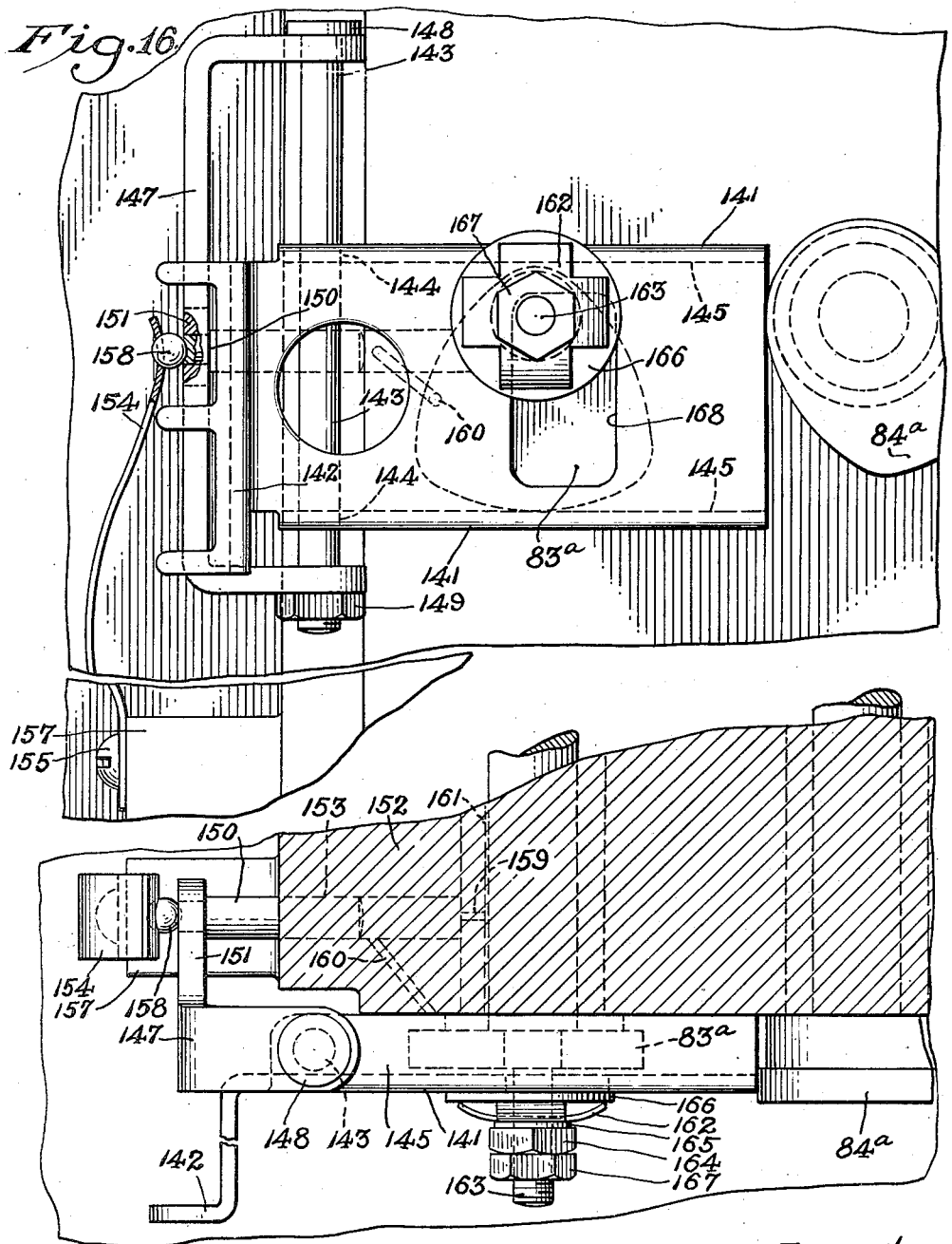

Patented Sept. 16, 1947

2,427,568

UNITED STATES PATENT OFFICE 2,427,568

MOTION-PICTURE FILM ACTUATING MECHANISM

Otto R. Nemeth, Chicago, Ill., assignor, by mesne assignments, to Helene Curtis Industries, Inc., a corporation of Illinois Application August 17, 1944, Serial No. 549,897

11 Claims. (Cl. 88—18.4)

1

This invention relates to improvements in motion picture apparatus and more especially concerns improvements in the means for intermittently actuating the film past the aperture of a motion picture machine.

An important object of the present invention is to provide an improved intermittent-grip type of film strip feed mechanism.

Another object is to provide a novel intermittent-grip type of film feeding mechanism in which the elements operable at high speed are of unusually small mass and compactness and therefore of low inertia factor in operation.

Another object is to provide a high speed intermittent film actuating means which is continually free from any play or looseness which would result in noise-generating slap or vibration during operation, since any looseness that might tend to develop due to wear after long use is continually compensated for or taken up.

Another object of the invention is to provide a novel shuttle type of intermittent film actuating mechanism in which the shuttle is driven smoothly and quietly in a manner to avoid operating torque and to relieve its bearings from unequal or excessive wear.

Still another object is to provide a shuttle type of intermittent film actuating mechanism in which the shuttle runs rectilinearly with the film.

A further object of the invention is to provide an improved lubricating system for a shuttle type intermittent film actuating mechanism.

Other objects, features, and advantages will be readily apparent from the following detailed description and the accompanying six sheets of drawings, in which:

Fig. 3 is an enlarged fragmentary sectional plan view taken substantially along the line 3—3 of Fig. 1 and showing details of the film feeding and shutter mechanisms.

Figs. 4 through 9 are enlarged, more or less schematic views showing the intermittent film actuating shuttle in various positions assumed during an operating cycle.

Fig. 10 is a greatly enlarged sectional plan view taken substantially in the plane of line 10—10 of Fig. 4.

Fig. 11 is an elevational view of the shuttle

Figure 1:
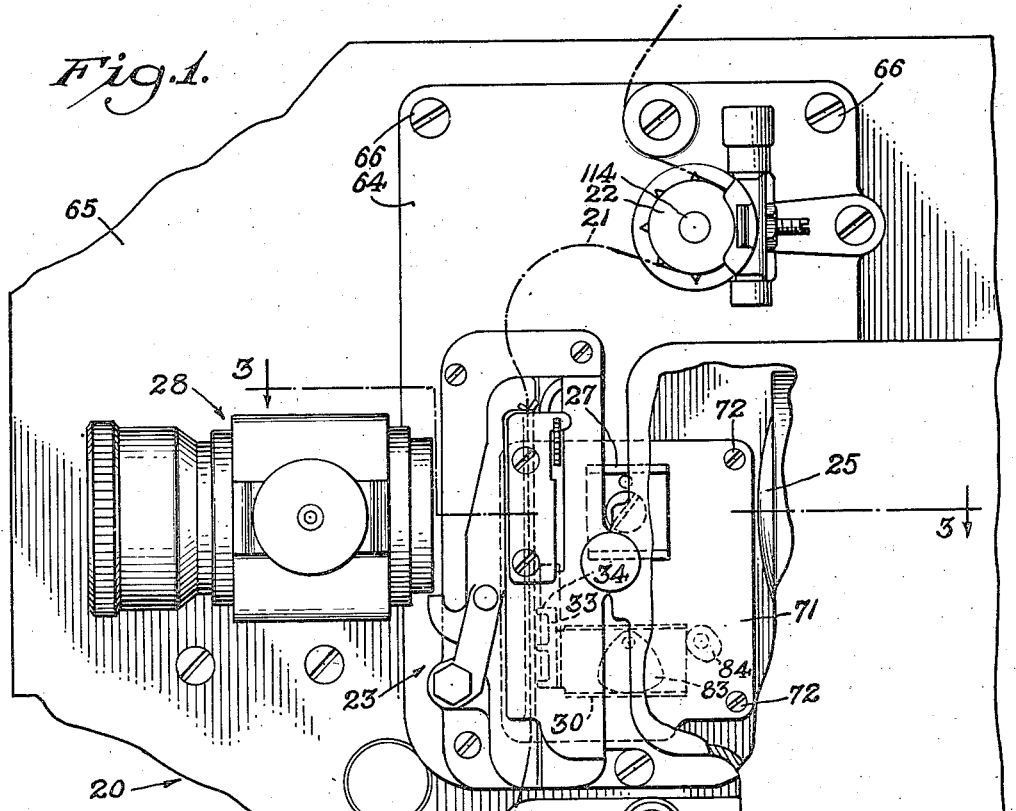
Figure 1 is a fragmentary side elevational view of a motion picture projector showing the film feeding mechanism thereof which embodies the features of my invention.

2 mechanism looking toward the right at the forward or film-gripping end portion of the shuttle assembly.

Fig. 12 is a shuttle movement diagram.

Figs. 13 and 14 are fragmentary vertical sectional detail views through the shuttle assembly taken substantially in the planes of lines 13—13 and 14—14 of Figs. 10 and 11, respectively.

Fig. 15 is a fragmentary vertical sectional detail view through the shuttle chamber taken substantially along the line 15—15 of Fig. 3.

Fig. 16 is a fragmental side elevational view of a modified form of shuttle assembly.

Fig. 17 is a sectional top plan view of the modified shuttle assembly shown in Fig. 16.

Various features of my invention are obviously applicable to motion picture cameras as well as projectors, but as a matter of convenience and without any desire to impose unnecessary limitation I have illustrated the invention in connection with a motion picture projector 20 (Fig. 1) which is adapted to have a film strip 21 threaded to pass over vertically spaced coordinated constant feed sprockets 22 and intermediate the sprockets through a film gate 23. For details of the preferred form of the film gate shown, reference may be had to my co-pending application, Serial No. 560,370, filed October 26, 1944. Suffice it to say here that the film gate 23 has an aperture 24 (Fig. 2) across which each successive frame of the film 21 is adapted to be centered to receive therethrough a beam of light which is concentrated by means of a condenser lens 25 and projected through a shutter 27 located between the lens and the film gate. The illuminated image of the framed picture is projected by a projection lens system 28 onto a screen (not shown) disposed at a distance in front of the projector.

Within the film gate 23, intermittent actuation of the film strip 21 one frame at a time past the aperture 24 is effected by means comprising a shuttle mechanism 29 (Fig. 3). The principal component of the shuttle mechanism is a compact shuttle member 30.

According to the present invention the shuttle 30 is formed on one piece from suitable hardened sheet steel. It comprises an elongated flat body formed with a coextensive pair of identical parallel rail flanges 31 (Figs. 10 and 11) extending integrally at right angles from the longitudinal margins of the body. By preference the inner corners where the rail flanges 31 join the body of the shuttle are perfectly right angular. At its forward end the shuttle is formed with an outwardly extending right angular offsetting flange 32 which is in turn provided with a forwardly extending right angular claw flange 33 lying parallel to the body of the shuttle and formed with integral forwardly extending film engaging elements or claw teeth 34. In the present instance three of the teeth 34 are provided in a vertical series so as to engage simultaneously in three sprocket perforations 35 in the film strip 21 (see Figs. 5 and 6). This plurality of claw teeth thoroughly distributes the strain incident to the advancing pull upon the film by the claw and thus minimizes wear of the film at the sprocket perforations, avoiding enlargement of the perforations which would tend to cause unsteadiness in the projected motion pictures.

The shuttle 30 is mounted and driven in such a manner that it follows a cyclical operating path in which entry of the claw teeth 34 into the film apertures 35 is substantially perpendicular to the plane of the film 21, the film actuating movement of the shuttle is rectilinear with the film, and exit of the claw teeth from the apertures 35 is substantially perpendicular to the plane of the film. To this end the shuttle 30 is guided for vertical reciprocation by a guide rod 37, (Figs. 11 and 13) which extends through axially aligned bearing holes 38 adjacent to the forward ends of the longitudinal flanges 31. Horizontal or film engaging and withdrawal movements of the shuttle 30 are enabled by mounting the guide rod 37 for movement in a direction transverse to its axis preferably on a hinge member 39 which in turn is pivotally supported by a yoke bracket 40 (Figs. 10, 11 and 14).

In the present instance, the guide rod 37 is preferably formed with conically tapered ends 41 in the fashion of center points and the hinge member 39 is formed in substantially U-shape to provide spaced parallel horizontal flanges 42 adapted to receive the ends 41. The lower flange 42 is formed with a complementary conical center point bearing seat 43 in which the lower pointed end 41 is received in centered relation while the upper flange 42 is formed with a concentric bearing hole 44 of enough clearance to pass the full diameter of the guide rod freely during assembly. Threaded into the hole 44 is a locking screw 45 formed with a complementary conical bearing seat 47 receptive of the upper pointed end 41 of the rod. A lock nut 48 threaded about the locking screw 45 and driven against the upper flange 42 locks the screw 45 in the precise adjusted condition preferred. Through this arrangement the guide rod 37 can be properly adjusted to assume the optimum axial position relative to the shuttle 30 to enable smooth, non-binding vertical and rotary sliding movements of the shuttle during operation.

A pivotal hinge connection between the hinge member 39 and the yoke bracket 40 is afforded by a hinge pin 49 (Figs. 11 and 14). For convenience in mounting and effecting proper axial alignment of the hinge pin and the bearing surfaces of the hinge and the supporting yoke, the hinge pin 49 is formed at its opposite ends with center points 50. A complementary conical bearing seat 51 for centered reception of the lower center point 50 is formed in the lower one of a pair of spaced parallel horizontal yoke flanges 52 while the adjacent cylindrical portion of the hinge pin passes through a bearing hole 53 in the lower hinge flange 42 which may be in flat face-to-face bearing contact with the upper or inner face of the lower yoke flange 52. At its upper end portion, the hinge pin 49 extends slidably through a bearing hole 54 in the upper yoke flange 52 and the upper center point 50 is received in centered relation in a conical seat 55 in a locking screw 57 threaded into a hinge pin assembly passage aperture 58 in the upper hinge flange 42. A lock nut 59 threaded onto an upwardly extending portion of the locking screw 57 and bearing against the upper face of the upper hinge flange 42 locks the screw in any preferred adjusted position. Thus, the shuttle assembly 29 can be easily and quickly preassembled into a unit or taken apart by the simple expedient of manipulating the guide rod 37 and its locking screw 45 and the hinge pin 49 and its locking screw 57.

In assembly, relative vertical displacement of the hinge member 39 and the supporting yoke 40 longitudinally of the hinge pin 49 is thoroughly resisted by means such as a coiled compression spring 60 which is mounted about the hinge pin 49 and held under compression between the upper surface of the lower hinge flange 42 and the opposing lower or inner surface of the upper yoke flange 52. This arrangement also assures that any wear that may possibly occur in the interface bearing surfaces of the lower hinge flange 42 and the lower yoke flange 52 as a result of long use will be continuously taken up and thus permanently avoid any possibility of rattle developing in this area.

A second function preferably consigned to the spring 60 is that of a torsion spring action upon the hinge member 39 to urge it constantly angularly about the axis of the hinge pin 49 to swing rearwardly (counterclockwise as seen in Fig. 10) to impel the shuttle 30 toward neutral or disengaged position relative to the film strip 21. For this purpose, the spring 60 is formed at its opposite ends with respective lateral hooks 61 and 62 which are preferably identical in shape and are hooked in opposite directions. In the course of assembly the hooks 61 and 62 are gripped and drawn in opposite directions about the spring axis to wind up the spring approximately one turn and place it under torsion load. The hook 61 is then engaged against the adjacent or inner edge of the yoke 40 while the hook 62 is engaged against the adjacent eccentric vertical edge of the hinge member 39. As a result, the spring hook 62 constantly urges the hinge member 39 in a rearward direction.

As best seen in Figs. 3, 10 and 15, the shuttle mechanism 29 preassembled as a unit is preferably housed within a chamber 63 provided therefore in a supporting casting 64. At its margins the casting 64 is secured to a vertical mounting plate 65 by means of screws 66 in substantially closing relation to an opening 67 in the plate. Within the recess 63 a shoulder 68 receives a right angular attaching flange 69 extending from the yoke 40 and secured to the side face of the shoulder by means such as screws 70 (Fig. 4) which are readily accessible to a screw driver.

A closure for the shuttle mechanism chamber 63 is provided by a cover 71 (Figs. 1, 3, 10 and 15) which may be removably secured to the casting 64 by means of screws 72. Thus the only portion of the shuttle 30 extending outside of the shuttle mechanism chamber is the offsetting flange 32 and the claw 33 for the passage of which in assembly, as well as for operational clearance, the cover 71 is provided with a slot 73 (Figs. 4 through 10). As a result of this arrangement, the enclosed shuttle mechanism 29 may be located inwardly from or behind the film gate 23 and the shutter 27, with only the shuttle claw 33 extended into cooperating relation with the film gate by the offsetting flange 32.

Friction loss in operation of the shuttle 30 is minimized by holding the bearing contact area for the shuttle to a minimum. This is accomplished herein by mounting a narrow vertical bearing rail 74 (Figs. 4, 10 and 15) in a rabbet 75 adjacent to the rear end of the shuttle 30 and there holding it by such means as a pin 76. The rail 74 provides a hardened bearing surface 77 contacted by the narrow longitudinal bearing edges of the parallel flanges 31 of the shuttle. Yieldably holding the shuttle against the bearing rail 74 is a preferably semispherical pressure button 78 which makes a point bearing contact with the outer side face of the shuttle opposite the bearing rail and is urged resiliently toward the shuttle by a supporting leaf spring 79. The latter may be riveted as at 80 to cover 71 which has a hollow clearance embossment 81 within which to accommodate the free end of the leaf spring and the pressure button 78, especially when the leaf spring is flexed into the plane of the cover as an incident to loading thereof for applying resilient shuttle-pressing force to the pressure button.

Vertical and horizontal reciprocations of the shuttle 30 in an intermittent film actuating cycle are effected by a pair of synchronized cams 83 and 84, respectively. The vertical reciprocation cam 83 is preferably of generally heart shape and adapted to drive against the opposing inner surfaces of the horizontal longitudinal flanges 31 of the shuttle serving as followers. The horizontal reciprocation cam 84 has one relatively narrow lobe and drives against the rear end edge of the main body of the shuttle 30 serving as a follower for this purpose.

The vertical reciprocation cam 83 is formed with a substantially one-third circumference major radius or dwell edge 85 joined by a smoothly merging leading transition point or curve 87 to an arcuate advancing transition edge 88. A smoothly merging trailing transition point or curve 89 joins the dwell edge 85 to an arcuate trailing transition edge 90. The advancing and trailing transition edges merge smoothly with or at the minor radius of the cam. All points or zones of mergence are generated to assume the utmost smoothness of action and freedom from vibration-inducing jerkiness during operation of the cam.

In each revolution of the vertical reciprocation cam 83 the shuttle 30 is caused to travel very rapidly, that is, in one-sixth of a revolution in each direction between its upper and lower reciprocal limits and to dwell in each of such limits throughout one-third of a revolution of the cam.

On its major radius, the single narrow eccentric lobe of the horizontal reciprocation cam 84 is provided with an extended concentric dwell edge 91 merging smoothly with an arcuate leading transition edge 92 and a similarly proportioned trailing transition edge 93. Opposite the extended dwell edge 91, the cam 84 is formed with a minor radius semi-circular concentric dwell edge 94. By proper proportioning, the extended dwell edge 91 makes contact with the shuttle throughout approximately one-twelfth of a revolution of the cam while the minor radius dwell edge 94 makes contact throughout approximately one-half revolution.

To assist in accurate synchronization of the cams 83 and 84 during assembly, they may be formed with suitable visual indexing means such as respective superficial indexing grooves 95 and 97 which centrally bisect the arcs of the major radius dwell edges 85 and 91, respectively. When these indexing grooves are precisely aligned, with the lobes of the cams extending in the same direction (Fig. 5), proper synchronization is attained.

In practical application of the shuttle 30 in a 16 mm. motion picture projector, it must be driven to operate at the standard current rate which is presently twenty-four per second. To this end the reciprocation cams 83 and 84 are driven in a ratio of two to one, the vertical reciprocation cam 83 operating at 2880 revolutions per minute and the horizontal reciprocation cam 84 operating at 1440 revolutions per minute. At this high speed appreciable torque may tend to develop in the shuttle 30 in overcoming the inertia of the film strip 21 as an incident to each frame advance thereof. Therefore, I operate the reciprocation cams 83 and 84 in a manner to neutralize such torque and thus save the guide rod 37 and the bearing surfaces 38 from excessive wear which might otherwise result from the torque-induced tendency of the shuttle to skew in its vertical plane and bind the bearing surfaces 38 against the guide rod. To this end, the main body length of the shuttle 30 is as short as practicable and the vertical reciprocation cam 83 is driven counter-clockwise as viewed from the side in Fig. 4 while the horizontal reciprocation cam 84 is driven clockwise. As a result, the leading transition edge 88 of the vertical reciprocation cam engages the lower follower flange 31 of the shuttle adjacent to the guide rod 37 while at the same time the horizontal reciprocation cam dwell edge 91 is thrusting forwardly and wiping upwardly against the lower rear corner portion of the shuttle. This coincides with the inertia counteraction against the claw teeth 34 incident to putting the stationary film strip 21 into motion for the high speed downpull for a one frame advance. A step in this action is shown graphically in the dot dash position of Fig. 5, while the full line position of Fig. 5 shows how the anti-torque action of the cams continues to about the halfway point in the downward film-advancing movement of the shuttle.

For a clear understanding of a complete operating cycle of the shuttle 30, reference may be had to the motion diagram of Fig. 12 in which several stages in the cycle are identified by letters accompanied by parenthetical numerals referring to selected ones of Figs. 1 and 4 to 9, inclusive, wherein the relationship of the shuttle and the motivating cams is shown as found in the several respective selected stages or points in the cycle. Thus, the starting point S may be considered to be as shown in Fig. 1 at the midpoint in the lower limit dwell preceding movement of the shuttle into engagement with the film. In the continuing progression of the cam 83, the dwell edge 85 leaves the lower follower flange 31 and the leading horizontal reciprocation cam transition edge 92 comes into play to thrust the shuttle 30 by gradual increments horizontally in opposition to the torsion of the hinge spring 69 while the leading transition edge 88 of the cam 83 drives the shuttle upwardly. As a result, the shuttle moves on a flat arc toward the point of entry into the film until it reaches an upper limit point T where the claw teeth 34 are just short of entry into the sprocket apertures 35 with which they are now aligned (broken outline position of Fig. 4). At this point the dwell edge 85 engages the upper follower flange 31 to retain the shuttle in its upper limit position and the leading transition edge 92 continues its horizontal thrust upon the shuttle until the claw teeth 34 have moved rectilinearly the remaining distance to a point U of total engagement with the film 21 (broken outline position of Fig. 5).

Thereupon the major radius dwell edge 91 acts upon the rear follower edge of the shuttle 30 to retain it in full film-engaging position while the leading transition edge 88 of the vertical reciprocation cam drives the shuttle straight down at high speed to pull the film 21 a distance of one frame past the film gate aperture 24. At the conclusion of the film atcuation movement, the dwell edge 85 again engages the lower follower flange 31 to hold the shuttle in its lower limit while the dwell edge 91 leaves the rear end follower edge of the shuttle. Thence the shuttle 30 slides rearwardly on the receding trailing transition edge 93, being held for rectilinear movement out of engagement with the film under the torsion impulse of the hinge spring 60 until the claw teeth 34 have traveled from a point V to a point W where the claw teeth are just clear of the film. From this point the advancing transition edge 88 again comes into play against the upper follower flange 31 to drive the shuttle upwardly while it continues to recede and thus travels an arcuate upward path until it reaches the limit of recession by engagement of the rear follower edge of the shuttle with the minor radius dwell edge 94. Upward movement of the shuttle 30 finally causes it to reach an upper neutral or ultimate recession point R where it dwells momentarily until the dwell edge 85 of the vertical reciprocation cam again leaves the upper follower flange 31. Shuttle movement is then reversed while engagement persists with the minor radius semi-circular dwell edge 94 of the horizontal reciprocation cam so that the shuttle travels straight down to the starting point S (Figs. 9 and 12).

It will thus be evident that by the novel cam action which effects actuation of the film during only a very small fraction of the high speed cam cycle there is afforded a maximum interval between each frame advance of the film for passage of the projection beam through the framed image. Thereby utmost brilliance and clarity of projection or image reproduction and a very smooth illusion of action are attained upon the screen. In spite of this high speed, film life is preserved to an unusual degree insofar as wear from engagement by the claw teeth is concerned because all force applied by the shuttle to the film is strictly in the plane of the film. There is complete freedom from any sawing action or transverse strain upon the film, because of the manner in which entry and withdrawal movements of the shuttle occur while the film is stationary and free from motivating action of the shuttle. Since the shuttle 30 is preferably only as long as needed for operation of the vertical reciprocation cam 83 therein and to accommodate the guide rod 37, its mass is small and free from undue inertia torque and wear during the high speed operation.

In the attainment of the advantageously high ratio of frame-changing film movement speed to illumination interval, the shutter 27 rotates one and one-half times during each cycle of operation of the vertical reciprocation cam 83; and each intermittent actuation of the film 21 is synchronized to occur during the light-blocking phase of one-half revolution of the shutter. As a result there are three full exposures to light of each frame of the film while the vertical reciprocation cam 83 executes two complete revolutions, the horizontal reciprocation cam 81 one revolution, and the shutter 27 one and one-half revolutions.

Synchronized driving of the shutter 27 and the shuttle actuating cams 83 and 84 is accomplished through a gear train by a prime mover such as a motor 98 (Figs. 2 and 3) which may be mounted in a suitable manner upon the mounting plate 65. The motor actuates a driving pinion 99 acting through a transmission gear 100 to drive a gear 101 on a shaft 102 which carries the vertical reciprocation cam 83. A translating pinion 103 on the cam shaft 102 motivates a gear 104 on a shaft 105 carrying the horizontal reciprocation cam 84. The cam shaft gear 104 in turn meshes with a translating idler 107 which drives a gear 108 on a shaft 109 carrying the shuttle 27. A fly wheel 110 is carried by the cam shaft 102.

Figure 2:
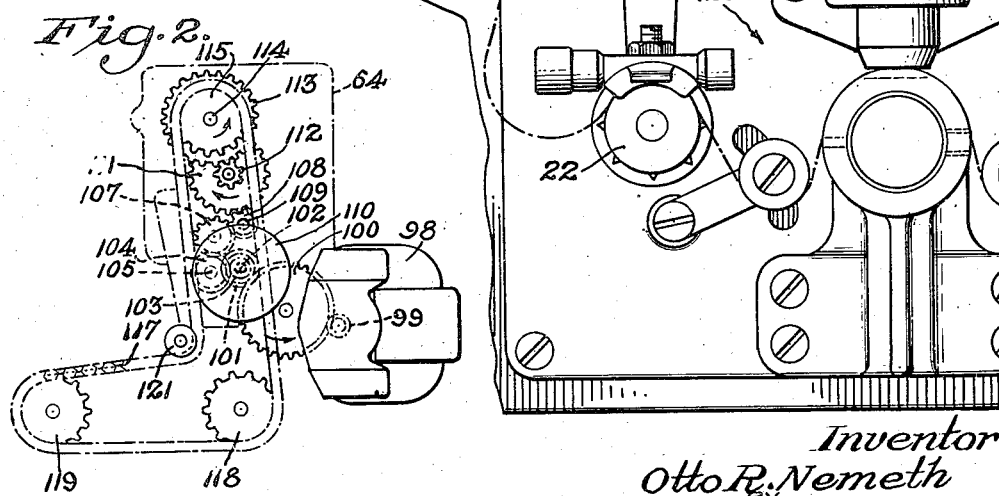
Fig. 2 is a reduced scale diagrammatic view showing the driving arrangement for the film feeding mechanism in rear elevation.

Film feeding operation of the sprockets 22 is effected synchronously with the shuttle cams 83 and 84 and the shutter 27 by driving the sprockets through the medium of the same train of gears as the cam and shutter shafts. Accordingly, the shutter shaft gear 108 meshes with a transmission idler gear 111 mounted on a common shaft with a driving pinion 112 which in turn meshes with and drives a gear 113 keyed upon a shaft 114 which carries the upper film sprocket 22. Also keyed upon the shaft 114 is a sprocket 115 which is engaged by a sprocket chain 117 running down between the gear train and the fly wheel 110 and over a horizontally spaced pair of lower sprockets 118 and 119 keyed upon the respective shafts of the lower film sprockets 22 which are located on the opposite sides, respectively, of a sound head 120 (Fig. 1). Only one of the lower sprockets 22 is shown in Fig. 1. An adjustable tensioning idler pulley 121 engages the sprocket chain 117 as indicated in Fig. 2.

For convenience in assembly, all of the gear train and the mechanisms directly operated thereby including the upper film sprocket 22 are preferably carried by the casting 64 as a unit adapted to be assembled complete with the mounting panel 65.

Due to the very high speed at which the shuttle 30 and the shuttle-operating cams 83 and 84 revolve during operation it is essential that they be adequately lubricated. According to the present invention this is accomplished in an improved manner as follows. Lubricating oil is introduced through a duct 123 (Figs. 10 and 15) and a port 124 in the casting 64 to a felt oil packing or wick 125 which closes the oil port and is seated in a vertical recess 127 behind the upper portions of the yoke bracket flange 69 serving as a retainer (Figs. 4 and 10). At its lower end, the oil packing 125 rests upon a bushing 128 serving as a bearing for the cam shaft 102 and the oil can thus filter down onto the bushing and migrate to its outer end where the hub of the cam 83 bears against the bushing. The oil working in between the opposed bearing surfaces of the bushing 128 and the hub of the cam 83 may enter a grinding relief groove 129 formed where the cam hub joins the shaft proper and work back along the cam shaft 102 or return to the adjoining hub and bushing bearing surfaces as needed. Oil that eventually drops to the bottom of the chamber 63 is soaked up by a mass of wool strands 130 (Figs. 4 and 15) provided in a bunch which will reach up high enough into the path of vertical reciprocation of the shuttle 30 to be compressed in the lower limit of shuttle reciprocation but which will not interfere with complete freedom of shuttle movement. As a result, under the compression of the downwardly moving shuttle 30 a small amount of oil saturating the strands 130 is squeezed out about the shuttle and adheres thereto when the shuttle moves away in its cycle of operation. Due to the high speed at which the shuttle 30 and the cam 83 operate oil which is gathered thereby from the oil strands 130 is flung about within the chamber 63 and maintains an adequate lubricating film of oil on the bearing surfaces of the shuttle flanges 31, on the guide rod 37, on the shuttle bearing rail 74, on the resilient retainer button 78, and on the bearing surfaces of the vertical and horizontal reciprocating cams 83 and 84.

Horizontal displacement of the oil strands 130 is avoided by anchoring the ends thereof within a vertical oil recess 131 behind the lower portion of the hinge yoke flange 69. A certain amount of oil works by capillarity up the wick-like anchored strand ends into the oil recess 131 while the pressure of the shuttle on the strand mass also probably assists this to some extent. Such oil works out along the bushing 128 to the end bearing surface thereon.

In order to avoid escape of lubricating oil from the shutter shaft 109 to the shutter 27, means is provided which not only resists escape of oil but actually attracts oil away from the shutter. Accordingly, as best seen in Figs. 3 and 15, the end of the shutter shaft 109 is equipped with a hub 132 which is housed within the chamber 63 and projects only slightly out beyond the cover 71 through an aperture 133 therein. Adjacent to its inner end, the hub 132 is formed with a relatively sharp oil ridge 134 of substantially greater diameter than the rest of the hub periphery which slopes sharply in frusto-conical section toward the inner end of the hub and substantially bell-shape toward a diminished diameter forward end. As a result, any oil which gets onto the hub 132 either by migration from the shaft 109 or by splash from the shuttle 30 or the operating cams, is drawn by centrifugal force to the greater diameter oil ridge 134 and there flung into space well to the interior of the chamber 63. This effectually prevents oil from escaping through the aperture 133. Furthermore the oil dispersed from the oil ridge 134, splatters about inside the chamber 63 and in particular onto the top of the shuttle 30 and the hinge member 39 as well as the horizontal reciprocation cam 84 and improves the lubrication of the moving parts.

As best seen in Fig. 3, the shutter 27 is preferably secured to the outer face of the hub 132 by means of a screw 135 threaded into the end of the shaft 109 and is keyed against rotation relative to the hub by means of an integral pressed out base lug 137 which fits in a diametrical keying groove 138 in the hub face. The hub itself is press fitted onto a reduced end portion 139 on the shaft 109.

In the modified form of the invention shown in Figs. 16 and 17 vertical and horizontal reciprocation of a shuttle 141 to drive an integral pull-down claw 142 rectilinearly in the manner hereinbefore described is accomplished with a different though essentially similarly operating form of shuttle-guiding mechanism. The motivating cams consisting of a vertical reciprocation cam 83a and a horizontal reciprocation cam 84a are of preferably identical construction and function as the previously described motivating cams 83 and 84.

Vertical reciprocation of the shuttle 141 are guided rectilinearly by a guiding rod 143 extending through appropriate bearing apertures formed in the forward end portions of parallel longitudinal follower and bearing flanges 145 on the shuttle. A support for the guide rod 143 enabling horizontal reciprocation thereof with the shuttle 141 is provided by U-shaped member or supporting yoke 147. In this instance the guide rod 143 may be formed on the order of a long bolt having a head 148 engaging the upper arm of the yoke while the lower end extends through the lower arm of the yoke and has a remaining nut 149 threaded thereon. The yoke 147 is guided for horizontal reciprocation by means of a guide pin 150 rigidly secured to a laterally extending central ear 151 and projecting into parallel opposition to the end face of a supporting plate or casting 152 into which the guide pin 150 extends slidably within a guide bore 153.

Means such as a bowed leaf spring 154 normally urges the yoke 147 and thereby the shuttle 141 toward the horizontal reciprocating cam 84a. As shown, the leaf spring 154 may be secured adjacent to one end, herein the lower end, by means of a screw 155 to a suitable supporting surface such as a boss 157 in a manner to be under constant tension load directed against the yoke ear 151 on the axis of the guide pin 150. By preference an antifriction device such as a ball bearing 158 is interposed between the spring 154 and the ear 151. Thus, as the shuttle 141 is reciprocated, the guide pin 155 correspondingly slides in the guide bore 153, and the spring 154 constantly urges the yoke 147 toward the support 152.

In order to avoid any drag incident to creation of a vacuum or compression of air in the guide bore 153 by the guide pin 150 which acts as a piston during reciprocal movements thereof, a pair of vents, herein an inner end vent 159 and a side vent 160, is provided to communicate the guide bore 153 with atmosphere. By preference the vents 159 and 160 also serve as part of a lubricating system. Accordingly, the end vent 159 communicates with an oil duct 161 within the bearing or bushing surrounding the shaft of the vertical reciprocation cam 83a so that as the guide pin 150 is retracted in the course of each cycle of operation a small amount of lubricating oil will be drawn into the guide bore 153. The vent 160 is preferably so located with respect to the limit of retraction of the guide pin 150 that in the last portion of retracting movement, the pin 150 uncovers the inner end of the vent 160 allowing a modicum of oil to enter from the pin-guiding bore 153. The vent 160 thus acting as an oil duct preferably extends angularly downwardly from the bottom of the guide bore 153 and opens through the face of the supporting member 152 adjacent to the shuttle 141 thereby affording lubrication for the bearing surface of the follower flanges 145. In the present instance the flanges 145 bear directly against the hardened surface of the member 152 which thus provides a broad and relatively wear-free bearing surface.

Means for retaining the shuttle 121 in bearing relation to the opposing surface of the supporting member 152 comprises a dished tension spring 162 which is held co-axially upon a threaded stud or extension 163 of the vertical reciprocation cam shaft by means of a compressing nut 164 driving against the spring through the medium of washer 165 and causing the spring to bear against a sliding plate or washer 166 bearing against the opposing outer face of the shuttle 141. A lock nut 167 locks the nut 164 in any preferred condition of spring tensioning adjustment. An aperture 168 of preferably vertically substantially rectangular form in the flat body or web of the shuttle 141 provides clearance for the shaft shank 163.

While I have illustrated and described certain preferred embodiments of my invention, it is to be understood that I do not thereby intend to limit my invention to the specific details disclosed, but contemplate that various modifications, substitutions, and alternative constructions may be effected without departing from the spirit and scope of the invention as defined in the appended claims.

I claim:

1. In combination in motion picture apparatus of the character described, a cyclically movable intermittent-grip type of shuttle for actuating a motion picture film strip, a support including a shoulder having a face opposing the shuttle and a second face at an angle to the first mentioned face, said first-mentioned face presenting bearing means engaged by the shuttle, and means for guiding the movements of the shuttle extending laterally from the shuttle along said second face of the shoulder.

2. Apparatus as defined in claim 1 in which the shuttle guiding means comprises a hinge member pivotally connected to the shuttle, and a supporting yoke member mounted on said shoulder and pivotally supporting the hinge member.

3. Apparatus as defined in claim 1 in which the shuttle guiding means includes a member movable bodily with the shuttle in one direction and has a guide pin projecting toward the second shoulder face, said second face having a bore therein for slidably receiving said pin.

4. In combination in an intermittent grip type of film actuating mechanism, a shuttle member having spaced parallel horizontal flanges providing opposed cam follower surfaces and edgewise bearing surfaces, means for driving the shuttle including a cam engaging said follower surfaces, means providing a bearing surface opposing said bearing edges, and means for constantly urging the shuttle toward said bearing surface.

5. In combination in an intermittent-grip type of film actuating shuttle mechanism, an elongated shuttle member of broad U-shape cross-section providing opposed cam follower flanges, a vertical reciprocation cam mounted between and acting upon said followers to drive the shuttle rapidly through a vertical reciprocation cycle, the length of the shuttle being only slightly greater than required to accommodate said cam, means adjacent to one end only of the follower flanges for guiding the shuttle in said cycle, means adjacent to the opposite end of the shuttle for actuating the shuttle in a horizontal direction at certain points in said vertical reciprocation cycle, and means affording a bearing seat engaged by the edges of said follower flanges.

6. In combination in motion picture apparatus of the character described, an intermittent-grip type of film actuating shuttle, means defining a chamber enclosing said shuttle, supporting means for the shuttle within said chamber including bearing means engaged by the shuttle at one side of the chamber, and means supported within the chamber at the opposite side of the shuttle from said bearing means and resiliently urging the shuttle toward said bearing means.

7. Apparatus as defined in claim 6 in which the shuttle housing chamber has a removable closure and said removable closure carries said means for resiliently urging the shuttle toward the bearing means.

8. In combination in motion picture apparatus, an intermittent-grip type of film actuating shuttle of elongated form, means adjacent to one end of the shuttle including a rod slidably cooperating with the shuttle to guide the latter for vertical reciprocation, said rod being mounted for movement with the shuttle in a horizontal direction to enable horizontal reciprocation of the shuttle, means resiliently urging said rod and thereby the shuttle in one direction horizontally, a horizontal reciprocation cam acting upon said shuttle in opposition to and cooperating with said resilient means for effecting horizontal reciprocations of the shuttle, means providing a bearing seat for one side of the shuttle, the shuttle being normally capable of swinging away from said bearing means about the axis of said guide rod, and resilient means for retaining the shuttle in bearing cooperation with said bearing seat.

9. A shuttle mechanism for motion picture apparatus comprising, in combination, an intermittent-grip type of film actuating shuttle of elongated form and broad U-shaped cross-section, the flanges of the shuttle being formed with coaxially aligned bearing apertures adjacent to the front end of the shuttle, a vertical reciprocation guide rod received through said apertures and in bearing engagement therein, a hinge member supporting said guide rod and enabling horizontal reciprocation of the shuttle member and guide rod, a supporting member for said hinge member, a hinge pin connecting the hinge member and the supporting member, and a combined compression-torsion spring cooperating with said hinge pin acting to maintain the hinge member and the supporting member in predetermined assembled relation while at the same time acting on said hinge member to urge it constantly in one rotative direction about said pin.

10. In combination in a motion picture apparatus, intermittent-grip type film advancing mechanism including a film engaging shuttle, means for guiding the shuttle for movement in an operating cycle, said means including a hinge member and a resilient device coacting with said hinge member for continuously urging the shuttle in one direction, means for periodically urging the shuttle in opposition to said resilient device, means providing a bearing surface upon which the shuttle is movable in its cycle of operation, and means for holding the shuttle on said bearing surface.

11. In combination in motion picture apparatus, an elongated intermittent-grip type of film actuating shuttle, such shuttle being of generally broad U-shaped cross section with spaced parallel flanges having coplanar bearing edges, means providing a bearing surface engaged by said bearing edges, means for driving the shuttle through an operative cycle, said means including a cam operating within the U of the shuttle and utilizing the bearing flanges as cam followers, said cam being driven by a shaft having an extension, said shaft having an opening therethrough affording clearance for said shaft extension, and means comprising a spring-urged member mounted on said shaft extension for holding the shuttle in bearing relation to said shaft.

OTTO R. NEMETH.

REFERENCES CITED

The following references are of record in the file of this patent:

UNITED STATES PATENTS

| Number | Name | Date |
|---|---|---|
| 1,672,845 | Capstaff | June 5, 1928 |
| 1,900,876 | Wittel | Mar. 7, 1933 |
| 2,200,342 | Reardon | May 14, 1940 |
| 2,076,919 | Ross | Apr. 13, 1937 |
| 1,833,371 | Owens | Nov. 24, 1931 |
| 1,944,027 | Foster | Jan. 16, 1934 |
| 1,978,878 | Bundick et al. | Oct. 30, 1934 |
| 2,148,493 | Nowland | Feb. 28, 1939 |
| 1,899,816 | Maier | Feb. 28, 1933 |
| 2,069,639 | Andres | Feb. 2, 1937 |
| 2,211,363 | Brenkert | Aug. 13, 1940 |
| 1,680,295 | Howell | Aug. 14, 1928 |
| 1,772,772 | Fischer | Aug. 12, 1930 |
| 1,940,312 | Lessler | Dec. 19, 1933 |
| 2,015,528 | Larson | Sept. 24, 1935 |
| 2,027,678 | Debrie | Jan. 14, 1936 |
| 2,051,602 | Holden | Aug. 18, 1936 |
| 2,057,153 | Lessler | Oct. 13, 1936 |

FOREIGN PATENTS

| Number | Country | Date |
|---|---|---|
| 412,198 | Germany | Apr. 14, 1925 |
| 334,444 | Germany | Mar. 14, 1921 |
| 375,765 | Great Britain | Dec. 23, 1930 |